US010823110B2

(12) United States Patent
Médard De Chardon et al.

(10) Patent No.: US 10,823,110 B2
(45) Date of Patent: Nov. 3, 2020

(54) APPARATUS FOR PERFORMING ENERGY TRANSFORMATION BETWEEN THERMAL ENERGY AND ACOUSTIC ENERGY

(71) Applicant: ETALIM INC., Vancouver (CA)

(72) Inventors: Briac Médard De Chardon, Vancouver (CA); Thomas Walter Steiner, Burnaby (CA)

(73) Assignee: Etalim Inc., Burnaby (CA)

( * ) Notice: Subject to any disclaimer, the term of this patent is extended or adjusted under 35 U.S.C. 154(b) by 0 days.

(21) Appl. No.: 16/463,334

(22) PCT Filed: Oct. 20, 2017

(86) PCT No.: PCT/CA2017/000232
§ 371 (c)(1),
(2) Date: May 22, 2019

(87) PCT Pub. No.: WO2018/094500
PCT Pub. Date: May 31, 2018

(65) Prior Publication Data
US 2019/0376469 A1 Dec. 12, 2019

Related U.S. Application Data

(60) Provisional application No. 62/426,418, filed on Nov. 25, 2016.

(51) Int. Cl.
*F03G 7/00* (2006.01)
*F02G 1/053* (2006.01)
(Continued)

(52) U.S. Cl.
CPC ............ *F02G 1/053* (2013.01); *F28D 17/02* (2013.01); *F02G 2243/54* (2013.01);
(Continued)

(58) Field of Classification Search
CPC .. F02G 1/053; F02G 2243/54; F02G 2253/06; F02G 2280/50; F28D 17/02; F28D 17/04; F25B 9/149; F25B 2309/1405
See application file for complete search history.

(56) References Cited

U.S. PATENT DOCUMENTS 6,314,740 B1 * 11/2001 De Blok ................ F02G 1/043 62/6
6,868,673 B2 * 3/2005 Weiland .................... F02C 3/02 60/698
(Continued)

FOREIGN PATENT DOCUMENTS

WO 2005001269 A1 1/2005
WO WO-2010107308 A1 * 9/2010 ............ F02G 1/043
WO 2014043790 A1 3/2014

OTHER PUBLICATIONS

International Search Report issued by the Canadian Intellectual Property Office in connection with International Patent Application No. PCT/CA2017/000232, dated Mar. 5, 2018, 3 pages.
(Continued)

*Primary Examiner* — Shafiq Mian

(57) ABSTRACT

An apparatus for performing energy transformation between thermal energy and acoustic energy is in a thermoacoustic transducer apparatus is disclosed. The acoustic energy is associated with a periodic flow of a working fluid within an acoustic power loop of the thermoacoustic transducer. The apparatus includes a common central plenum having a first fluid port for providing fluid communication with the acoustic power loop, and a plurality of discrete cylindrical thermal converters radially arranged about the plenum, each thermal converter including a regenerator. The apparatus also includes a second fluid port for providing fluid communication between the thermal converter and the acoustic power loop, and fluid flow passages in fluid communication with
(Continued)

the plenum and extending through the regenerator to the second fluid port.

25 Claims, 9 Drawing Sheets

(51) Int. Cl.
*F28D 17/02* (2006.01)
*F28D 17/04* (2006.01)

(52) U.S. Cl.
CPC ...... *F02G 2253/06* (2013.01); *F02G 2280/50* (2013.01); *F28D 17/04* (2013.01)

(56) References Cited

U.S. PATENT DOCUMENTS

| | | | | |
|---|---|---|---|---|
| 7,081,699 | B2 * | 7/2006 | Keolian | H01L 41/113 310/306 |
| 7,908,856 | B2 * | 3/2011 | Backhaus | F02G 1/0435 310/306 |
| 9,664,181 | B2 * | 5/2017 | Steiner | F03G 7/002 |
| 2013/0206355 | A1 | 8/2013 | Augenblick et al. | |
| 2018/0238266 | A1 * | 8/2018 | De Blok | F02G 1/057 |

OTHER PUBLICATIONS

Written Opinion of the International Searching Authority issued by the Canadian Intellectual Property Office in connection with International Patent Application No. PCT/CA2017/000232, dated Mar. 5, 2018, 4 pages.

* cited by examiner

APPARATUS FOR PERFORMING ENERGY TRANSFORMATION BETWEEN THERMAL ENERGY AND ACOUSTIC ENERGY

BACKGROUND

1. Field

This disclosure relates generally to a thermoacoustic transducer, and more particularly to a thermal apparatus for performing energy transformation between thermal energy and acoustic energy.

2. Description of Related Art

Thermoacoustic transducers may be configured to convert between mechanical energy and thermal energy. In operation as a heat engine, higher temperature thermal energy is received and lower temperature thermal energy rejected while the transducer converts a portion of the thermal energy into mechanical energy, which may be used to drive an electrical generator, for example. Alternatively a thermoacoustic transducer may be configured to operate as a heat pump where mechanical energy is received and the transducer converts the mechanical energy into a thermal energy transfer from lower temperature to higher temperature.

Thermoacoustic transducers generally include a thermal module that performs energy transformation between thermal energy and acoustic energy. When configured as a heat engine, increases in efficiency may be achieved by increasing a temperature differential between a hot side and a cold side of the transducer. The thermal module is subjected to this temperature differential, which may be several hundred degrees Celsius and will cause significant material stresses within the module. There is also a need to minimize losses within the thermal module to increase the overall efficiency of the thermoacoustic transducer.

SUMMARY

In accordance with one disclosed aspect there is provided an apparatus for performing energy transformation between thermal energy and acoustic energy, the acoustic energy being associated with a periodic flow of a working fluid within an acoustic power loop of a thermoacoustic transducer. The apparatus includes a common central plenum having a first fluid port for providing fluid communication with the acoustic power loop, and a plurality of discrete cylindrical thermal converters radially arranged about the plenum, each thermal converter including a regenerator. The apparatus also includes a second fluid port for providing fluid communication between the thermal converter and the acoustic power loop, and fluid flow passages in fluid communication with the plenum and extending through the regenerator to the second fluid port.

The apparatus may include a thermally conductive core disposed within the plenum and thermally coupled to each of the plurality of thermal converters for transferring heat between the core and the thermal converters.

Each thermal converter may include a first heat exchanger having a thermally conductive body defining a portion of the fluid flow passages extending between the plenum and the regenerator, the body being thermally coupled to the core and being operable to transfer thermal energy between the working fluid and the body.

The core may be operably configured to transfer thermal energy between an external environment and the working fluid flowing through the fluid passages within the body of the first heat exchanger.

Each thermal converter may include a second heat exchanger having a thermally conductive body defining a portion of the fluid flow passages extending between the regenerator and the second fluid port, the body being operably configured to transfer thermal energy between the working fluid and the body.

The core may include a centrally located conduit for receiving a heat source or heat sink.

The thermally conductive body may be thermally coupled to transfer heat between the thermally conductive body and one of a heat transfer fluid and a heat pipe.

The centrally located conduit may terminate in a plurality of return conduits extending back through the core adjacent to the centrally located conduit and the return conduits may be configured to transfer heat between the heat source or heat sink and the thermally conductive core.

The core may include a copper material and may further include an insert defining the centrally located conduit and the plurality of return conduits, the insert including a corrosion resistant material having sufficient strength at an operating temperature to withstand a pressure difference between the working fluid and an ambient pressure.

The acoustic power loop may include a thermal buffer in fluid communication with the first fluid port, the thermal buffer being shaped to reduce convective heat transfer from the working fluid due to circulating gas flows within the thermal buffer.

The apparatus may include a housing extending from an end of the thermal buffer distal to the first fluid port and enclosing the plenum and the plurality of thermal converters, the housing being operable to hold a charge of insulating gas at a pressure substantially equivalent to a pressure of the working fluid, the insulating gas being operable to reduce parasitic heat transfer between the working fluid and a surrounding environment.

The apparatus may include a thermally conductive core disposed within the plenum and thermally coupled to each of the plurality of thermal converters for transferring heat between the core and the thermal converters, the core having a centrally located conduit for receiving a heat source or heat sink and the housing may include a standoff sleeve providing access to the centrally located conduit from outside the housing for exchanging thermal energy between the heat source or heat sink and the core.

The acoustic power loop may include a plurality of compliant tubes each compliant tube being connected to one of the second fluid ports of the plurality of thermal converters, the compliant tubes being operable to deflect under thermally induced strains caused by a temperature differential across the thermal converter during operation.

The plurality of thermal converters may be radially arranged about the plenum in a plurality of adjacent rows, the first row being disposed proximate the first fluid port and each successive row being spaced further from the first fluid port.

The plenum may include a generally spherically shaped plenum and each of the plurality of thermal converters may be oriented in a substantially radial direction with respect to a center of the spherically shaped plenum.

The plenum may include a generally cylindrically shaped plenum and each of the plurality of thermal converters may be oriented in a substantially radial direction with respect to a center of the cylindrically shaped plenum.

The thermal converters in successive rows may be configured to operate at a different working fluid temperatures than the thermal converters in the first row.

The regenerators of the thermal converters in successive rows may have at least one of a differing length in the radial direction and a different cross-sectional area than the respective regenerators of the thermal converters in the first row.

The plenum may have a tapered cross-sectional flow area such that a flow area of the plenum proximate the first row differs from a flow area of the plenum proximate subsequent rows.

Each regenerator of the plurality of thermal converters may include a sleeve enclosing the regenerator, and the number of thermal converters in the plurality of thermal converters may be selected to provide a combined regenerator area that reduces fluid flow losses within the regenerator while reducing thermal stresses experienced by the sleeve due to a thermal gradient established across the regenerator during operation.

A thermoacoustic transducer apparatus may include the apparatus above and may include a mechanical converter operable to provide power conversion between acoustic power and mechanical power, the mechanical converter including at least one diaphragm defining a first chamber and a second chamber within the mechanical converter, and the acoustic power loop may include a first transmission duct extending between the first fluid port and the first chamber and a second transmission duct extending between the second fluid ports of the plurality of discrete thermal converters and the second chamber.

The second transmission duct may include a plurality of ducts extending from the respective second fluid ports and merging into one or more transmission ducts in fluid communication with the second chamber.

The plurality of ducts may include one of a compliant bellows section and an o-ring sealed section that facilitates accommodation of thermally induced strains caused by a temperature differential across the thermal converter during operation.

The acoustic power loop may include a thermal buffer in fluid communication with the first fluid port, the thermal buffer being shaped to reduce convective heat transfer from the working fluid due to circulating gas flows within the thermal buffer and may further include a housing extending from an end of the thermal buffer distal to the first fluid port and enclosing the plenum and the plurality of thermal converters, the housing being operable to hold a charge of insulating gas at a pressure substantially equivalent to a pressure of the working fluid, the insulating gas being operable to reduce parasitic heat transfer between the working fluid and a surrounding environment.

The housing may include one of a bellows seal and a sliding compliant seal between the housing and the respective distal ends of the thermal buffer and the second transmission duct.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
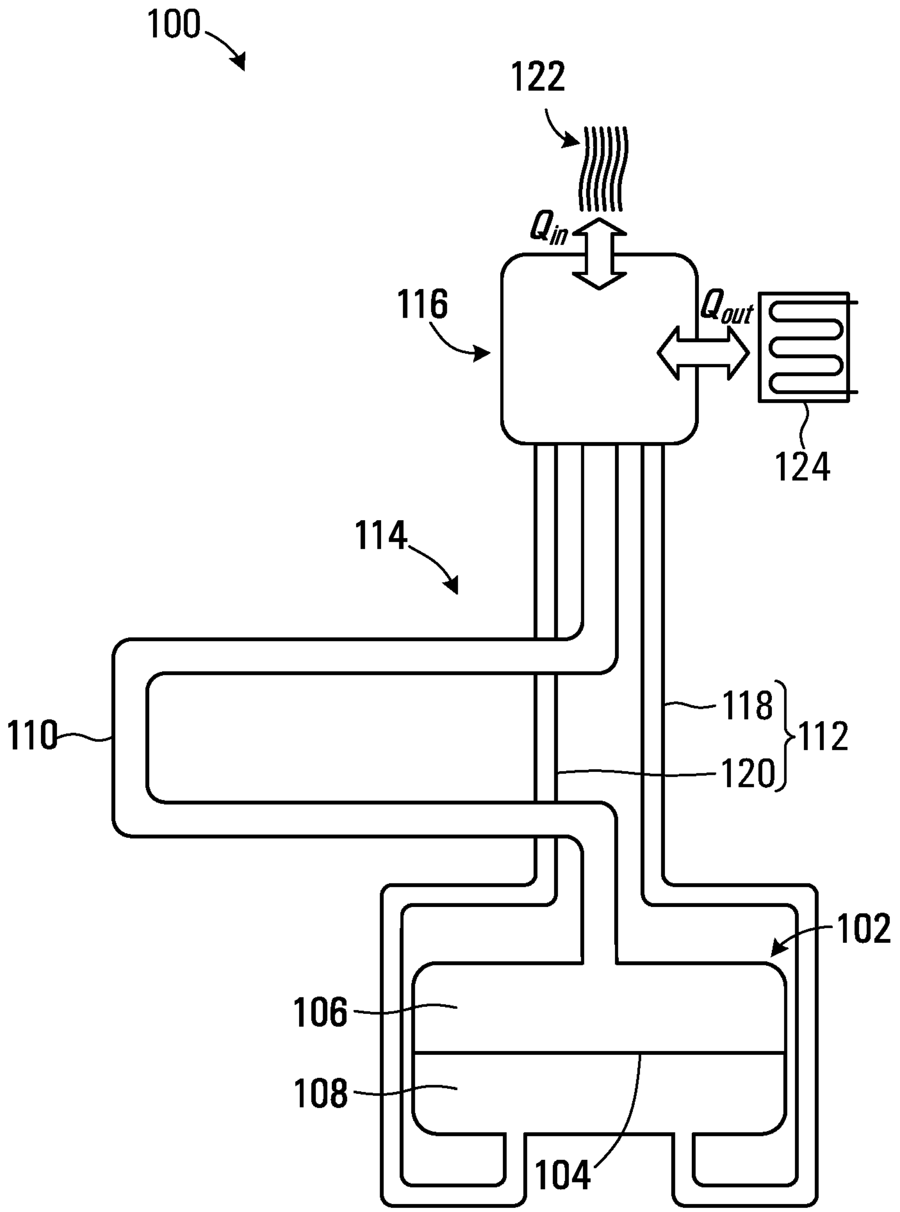
FIG. 1 is a schematic diagram of a thermoacoustic transducer apparatus.

Referring to FIG. 1, a thermoacoustic transducer apparatus according to a first embodiment of the invention is shown schematically at 100. The thermoacoustic transducer 100 includes a mechanical converter 102 operable to provide power conversion between acoustic power and mechanical power. The mechanical converter 102 includes a diaphragm 104 defining a first chamber 106 and a second chamber 108 within the mechanical converter. The thermoacoustic transducer 100 also includes a first transmission duct 110 in fluid communication with the first chamber 106 and a second transmission duct 112 in fluid communication with the second chamber 108. In the embodiment shown the second transmission duct 112 includes two separate transmission duct portions 118 and 120, but in other embodiments the second transmission duct 112 may be implemented using a single transmission duct or using more than two transmission ducts.

The first transmission duct 110, mechanical converter 102, and second transmission duct 112 form an acoustic power loop 114 having a working volume for containing a working gas operable to facilitate acoustic power flow between the second chamber and the first chamber. In one embodiment the working gas in the working volume comprises helium at a static pressure $p_m$ of about 120 bar. Further details of the acoustic power loop are disclosed in commonly owned PCT Patent application PCT/CA2013/000794 published as WO 2014/043790 and entitled "Thermoacoustic Transducer Apparatus Including a Transmission Duct", which is incorporated herein by reference in its entirety.

The thermoacoustic transducer 100 also includes a thermal apparatus 116 for performing energy transformation between thermal energy and acoustic energy, the acoustic energy being associated with a periodic flow of a working fluid within the acoustic power loop 114. The thermal apparatus 116 is in thermal communication with an external thermal source 122 and external thermal sink 124 for transferring thermal energy into or out of the apparatus.

During operation of the apparatus 100 as an engine, the diaphragm 104 undergoes resilient displacement to cause pressure oscillations within the acoustic power loop 114, and the working gas pressure within the working volume will thus swing between $p_m \pm / p|$, where /p| is a differential pressure swing amplitude. When the diaphragm 104 is displaced so as to cyclically reduce and expand a volume of the second chamber 108, the resulting compression and rarefaction in the working gas produces acoustic power which propagates through the second transmission duct 112 to the thermal apparatus 116. The thermal apparatus 116 operates to convert thermal energy $Q_{in}$ provided by the external thermal source 122 into acoustic energy, thereby amplifying the acoustic power traveling through the thermal apparatus 116. The amplified acoustic power leaving the thermal apparatus 116 propagates along the first transmission duct 110 back to the mechanical converter 102, where it is received in the first chamber 106. Pressure oscillations due to the amplified acoustic power in the first chamber 106 are operable to cyclically displace the diaphragm 104, thereby transferring acoustic power back to the second chamber 108. The diaphragm 104 may be coupled to transmit mechanical power to an external system (not shown in FIG. 1). The amplification of acoustic power in the thermal apparatus 116 thus provides sufficient power for sustaining periodic movement of the diaphragm 104, while also providing useful mechanical output power. The process described above operates at a natural frequency associated with the apparatus 100.

Alternatively for operation of the apparatus 100 as a heat pump, an externally provided mechanical power is transmitted to the diaphragm 104 to cause the cyclic displacement of the diaphragm 104. For acoustic power flowing from second chamber 108 to first chamber 106, the thermal apparatus 116 is configured to receive acoustic energy generated within the apparatus 100 and to convert the acoustic energy into a transfer of thermal energy from the external thermal source 122 to the external thermal sink 124 at higher temperature than the temperature of the external thermal source. Alternatively for acoustic power flow in the reverse direction, the functions of the external thermal source and external thermal sink are interchanged.

Figure 2:
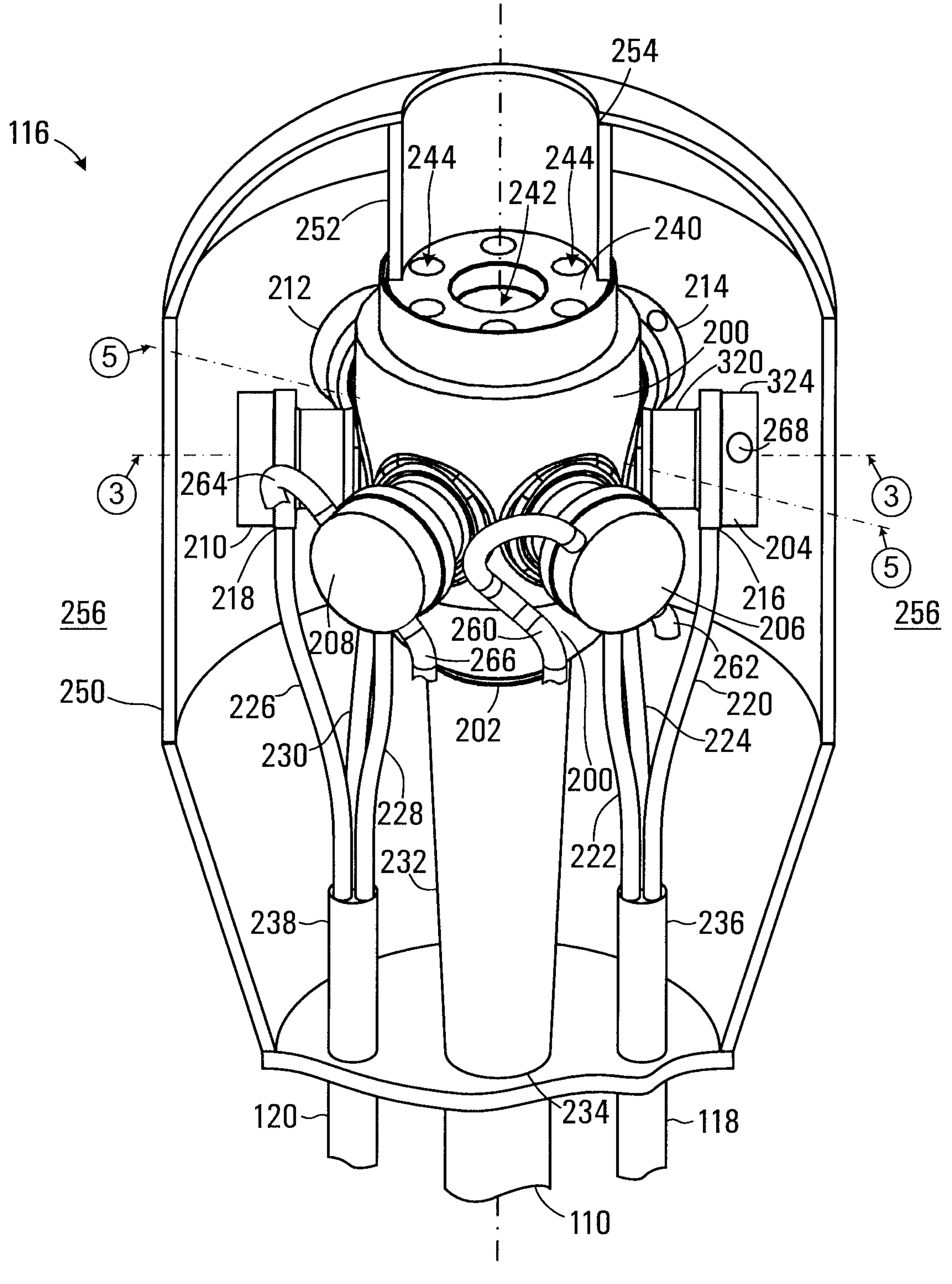
FIG. 2 is a perspective cut-away view of a thermal apparatus of the thermoacoustic transducer apparatus shown in FIG. 1.

The thermal apparatus 116 is shown in greater detail in FIG. 2. Referring to FIG. 2, the thermal apparatus 116 includes an enclosure 200 defining a common central plenum (not visible in FIG. 2) having a first fluid port 202 for providing fluid communication with the acoustic power loop 114. In this embodiment, the acoustic power loop 114 includes a thermal buffer 232 in fluid communication between the first fluid port 202 and the first transmission duct 110. The thermal buffer 232 has a tapered shape, which is selected to reduce convective heat transfer from the working fluid due to circulating gas flows within the thermal buffer.

The thermal apparatus 116 also includes a plurality of discrete cylindrical thermal converters 204, 206, 208, 210, 212, and 214 radially arranged about the plenum on the enclosure 200. Each thermal converter 204-214 includes a sleeve and a cap, of which the sleeve 320 and cap 324 of the first thermal converter 204 are indicated in FIG. 2. In this embodiment the thermal apparatus 116 is implemented using six discrete cylindrical thermal converters 204-214, but in other embodiments a greater or fewer number of thermal converters may be used. Each of the thermal converters 204-214 includes a second fluid port, of which second fluid ports 216 and 218 of the thermal converters 204 and 210 are visible in FIG. 2.

In this embodiment, the second fluid port 216 is coupled to a compliant tube 220 and the second fluid port 218 to a compliant tube 226. The second fluid ports of the thermal converters 206, 208, 212, and 214 are similarly connected to respective compliant tubes 222, 228, 230, and 224. The plurality of compliant tubes 220, 222, and 224 merge into a duct 236 in fluid communication with the second chamber 108 (shown in FIG. 1) via the portion 118 of the second transmission duct 112. Similarly, the plurality of compliant tubes 226, 228, and 230 merge into a duct 238 in fluid communication with the second chamber 108 via the portion 120 of the second transmission duct 112. In this embodiment, the second transmission duct 112 thus includes the plurality of compliant tubes 220-230 extending from the respective second fluid ports of the thermal converters 204-214, the ducts 236 and 238 into which the plurality of ducts merge, and the two separate transmission duct portions 118 and 120. The plurality of compliant tubes 220-230 are able to deflect under thermally induced strains caused by a temperature differential across the thermal converter during operation, which may be several hundred degrees Celsius.

Each thermal converter 204-214 further includes a pair of compliant tubes for circulating a heat transfer fluid to the respective thermal converters. Portions of the compliant tubes are shown in FIG. 2 to avoid obscuring other details of the thermal apparatus 116. Compliant tubes 260 and 262 are associated with the thermal converter 206 and compliant tubes 264 and 266 are associated with the thermal converter 208. The thermal converter 204 receives heat transfer fluid at an inlet 268 from a respective compliant tube (not shown). The remaining thermal converters 210, 212, and 214 each have a respective pair of compliant tubes for circulating heat exchange fluid through the thermal converters to the external thermal sink 124 (shown in FIG. 1). The compliant tubes are operable to deliver the heat transfer fluid to the thermal converters as described in more detail later herein. In one embodiment the heat transfer fluid may be a liquid coolant such as water. Like the compliant tubes 222-230, the compliant tubes 260-264 are able to deflect under thermally induced strains caused by the operating temperature differential. In other embodiments the thermal converters may be thermally coupled to the external thermal sink 124 via heat pipes.

The thermal apparatus 116 further includes an insert 240 disposed within the enclosure 200 defining a centrally located conduit 242 for receiving a heat source or heat sink (not shown) and return conduits 244. The insert 240 is described in more detail later herein.

In the embodiment shown the thermal apparatus 116 includes a housing 250, which is shown partially cut away in FIG. 2. In other embodiments the housing 250 may be omitted. The optional housing 250 extends from an end 234 of the thermal buffer 232 distal to the first fluid port 202 and encloses the enclosure 200 and the plurality of thermal converters 204-214 while providing access to the centrally located conduit 242 of the insert 240 for inserting the heat source or heat sink. In the embodiment shown, the thermal apparatus 116 includes a standoff sleeve 252 that extends upwardly from the insert 240 and couples to the housing 250 at a junction 254. The junction 254 provides a seal between the housing 250 and the standoff sleeve 252. The end 234 of the thermal buffer 232 and the transmission duct portions 118 and 120 and are also sealed at the point where these ducts pass through the housing 250 such that the housing is operable to hold a volume of insulating gas at a pressure substantially equivalent to a pressure of the working fluid. The insulating gas within the housing 250 is operable to reduce parasitic heat transfer between non-ambient temperature portions of the thermal apparatus 116 and a surrounding environment 256 primarily by reducing a required wall thickness of the sleeves 320 of the thermal converters 204-214. The charge of insulating gas reduces the pressure difference between the working volume and the interior of the housing 250. This also has the effect of reducing the required wall thicknesses of the plurality of compliant tubes

220-230. If these tubes were required to withstand the full pressure differential between the working fluid and an ambient pressure of the surrounding environment 256, the tubes would need to have a substantially thicker wall thickness and hence also be significantly longer to provide sufficient compliance to accommodate thermally induced strains.

In one embodiment the insulating gas may be the same gas as the working gas, having the advantage that a perfect seal would not be required between insulating gas and the working gas. A small leak may be provided between the housing 250 and a portion of the working volume of the acoustic power loop 114 enclosed within the housing to prevent a static pressure difference being established between the insulating gas and the working gas. The provided leak may be sufficiently small to reduce any unwanted dissipation of acoustic power.

In other embodiments, where the working gas is a gas such as helium or hydrogen, the relatively high thermal conductivity of these gasses makes them less suitable as insulating gases. In some embodiments the insulating gas may be thus be chosen to be a heavier, less thermally conductive gas, such as argon. In this case complete sealing would be required between the interior volume of the housing 250 and the working volume and these volumes would need to be tailored such that near equal pressure rise occurs in each volume as the apparatus is heated.

The housing 250 holding a volume of pressurized insulating gas facilitates the accommodation of thermal strains due to the temperature difference in the thermal converters. For example the compliant tubes 220-230 and thermal buffer 232 may include a bellows section for accommodating strains. Since the insulating gas and working gas would be at substantially similar pressures, the bellows would only have to withstand a smaller pressure differential due to operating pressure swings within the working gas. In other embodiments where the same gas is used for both the insulating gas and working gas, sliding o-ring seals may be provided at the end 234 of the thermal buffer 232 and other interfaces, such as where the transmission duct portions 118 and 120 pass through the housing 250.

In embodiments that do not implement the housing 250, the insulating gas would be ambient air. In such cases the regenerator sleeves 320 and inner enclosure 200 would be implemented as a pressure vessel, having sufficiently thick walls to withstand the difference between the static pressure of the working gas and the ambient pressure. This results in an increase in thermal stresses and wall thermal conduction, but has the advantage of substantially reduced pressurized volume and overall mass of the thermoacoustic transducer 100. The compliant tubes 220-230 and thermal buffer 232 would also need to have substantially thicker walls. However the standoff sleeve 252 would not have to withstand a pressure differential and could thus have a reduced wall thickness. The compliant tubes 220-230 would need to be longer to provide sufficient compliance to accommodate thermal strains. With ambient pressure air as an insulating gas, gas convection suppression is simplified due to the lower density of the insulating gas.

Figure 3:
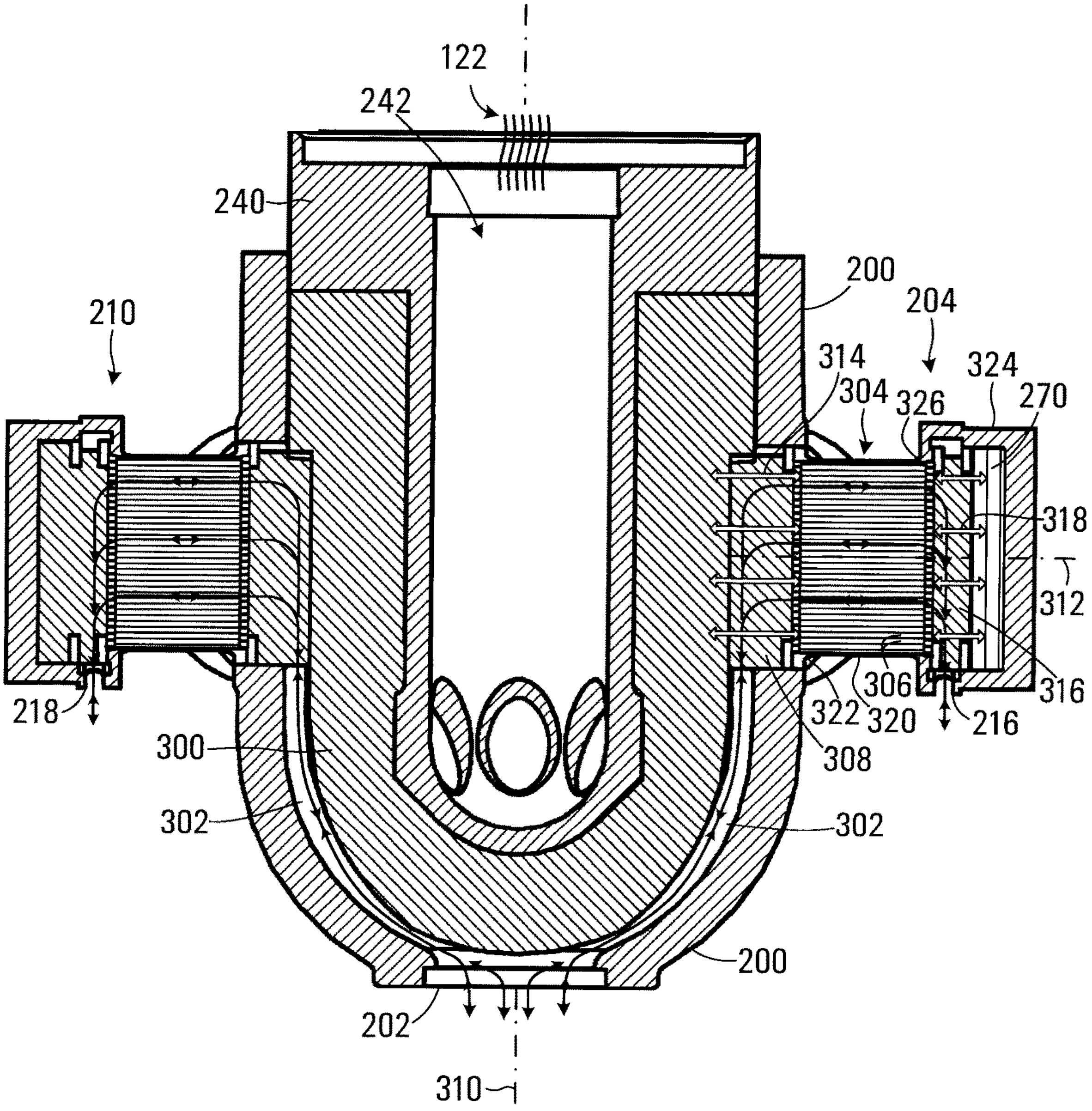
FIG. 3 is a first cross-sectional view of a portion of the thermal apparatus shown in FIG. 2.

The enclosure 200, insert 240, and plurality of discrete cylindrical thermal converters 204-214 are shown in cross sectional view in FIG. 3. The cross section in FIG. 3 is taken along the line 3-3 in FIG. 2. Referring to FIG. 3, a thermally conductive core 300 is disposed within the enclosure 200 and defines the central plenum 302 between the enclosure and the core. The thermal converter 204 includes a regenerator 304 having fluid flow passages 306 in fluid communication with the plenum 302 and extending through the regenerator to the second fluid port 216. Similarly, the thermal converter 210 and the remaining thermal converters 206, 208, 212, and 214 each include a regenerator having fluid flow passages in fluid communication with the plenum 302 and extending through the regenerator to the respective second fluid ports. The second fluid ports (216, 218 etc.) provide fluid communication between the thermal converters 204-214 and the acoustic power loop 114 (shown in FIG. 1) via the respective compliant tubes 220-230, 236, 238, and the transmission duct portions 118 and 120.

In the embodiment shown each thermal converter 204-214 includes a first heat exchanger 308 having a thermally conductive body defining a portion of the fluid flow passages extending between the plenum 302 and the regenerator 304. The body of the first heat exchanger 308 is thermally coupled to the thermally conductive core 300 and operable to transfer thermal energy between the working fluid flowing through the fluid passages and the body. The fluid flow into the first heat exchanger 308 is in a direction generally aligned with a cylindrical axis 310 of the enclosure 200 defining the plenum 302. The first heat exchanger 308 causes the fluid flow to change direction generally aligned with the cylindrical axis 310 to a direction generally aligned with a radial axis 312 of the thermal converter 204. The body of the first heat exchanger 308 is further operable to conduct heat between the first heat exchanger and the thermally conductive core 300 in a heat flow direction (indicated by arrows 314) generally aligned with the radial axis 312.

In the embodiment shown each thermal converter 204-214 also includes a second heat exchanger 316 having a thermally conductive body defining a portion of the fluid flow passages extending between the regenerator 306 and the second fluid port 216. The second heat exchanger 316 is enclosed within the cap 324. The body of the second heat exchanger 316 is operably configured to transfer thermal energy between the working fluid flowing through the fluid passages in a heat flow direction (indicated by arrows 318) that is generally aligned with radial axis 312. The heat transfer fluid flows into the inlet 268 (shown in FIG. 2) and through a finned portion 270 of the second heat exchanger 316 for exchanging heat with the external thermal sink 124 via the heat transfer fluid.

In one embodiment the first heat exchanger 308 and second heat exchanger 316 may be implemented using a heat exchange apparatus configured as disclosed in commonly owned U.S. Provisional Patent Application No. 62/281,548 by Steiner et al. filed on Jan. 21, 2016 and entitled "APPARATUS AND SYSTEM FOR EXCHANGING HEAT WITH A FLUID", which is incorporated herein by reference in its entirety.

Figure 4:
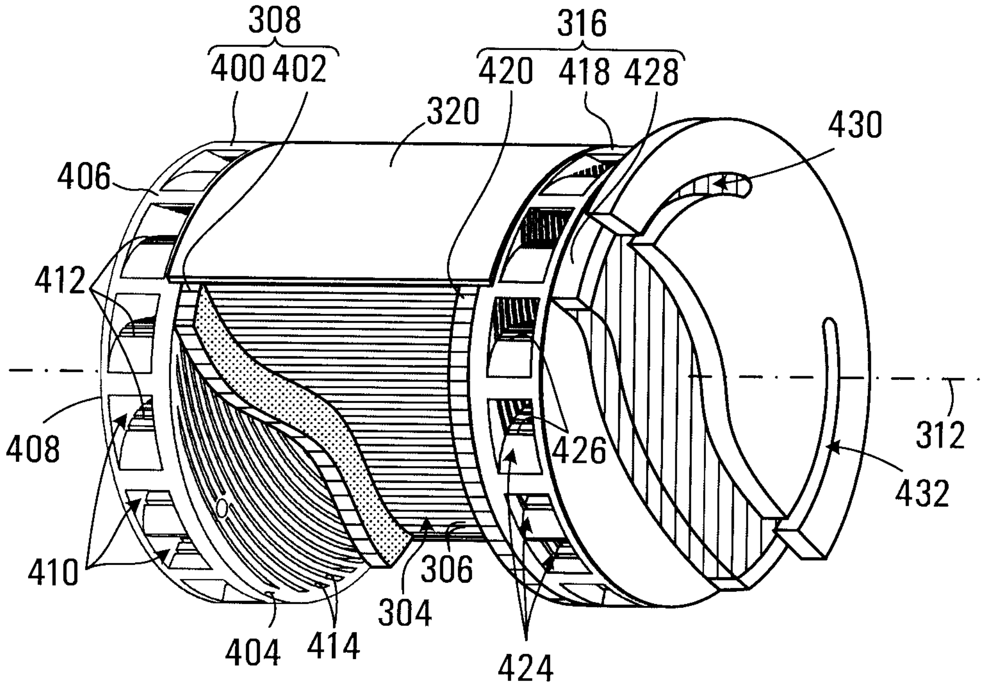
FIG. 4 is a partially cut away perspective view of a portion of a thermal converter of the thermal apparatus taken along the line 3-3 in FIG. 2.

A thermal converter configured generally in accordance with the disclosure in the above-referenced U.S. Provisional Patent Application is shown in partially cut away perspective view in FIG. 4. Referring to FIG. 4, the first heat exchanger 308 includes a manifold 400 and a heat exchange material 402. The manifold 400 has an interface surface 404 in thermal contact with the heat exchange material 402. The heat exchange material 402 is shown partially cut away to reveal the surface 404. The manifold 400 includes a thermally conductive body 406 operable to conduct heat between the surface 404 and a distally located heat transmitting surface 408 in a heat flow direction generally aligned with the radial axis 312 (i.e. as indicated by arrows 314 in FIG. 3). The manifold 400 includes a plurality of feed passages 410 extending through the thermally conductive body 406 in a generally transverse direction with respect to radial axis 312. The feed passages 410 are in communication with the central plenum 302 (shown in FIG. 3) for receiving or discharging fluid. The manifold 400 also includes a plurality of distribution passages 412, each having an end in fluid communication with at least one of the feed passages 410 and having respective openings 414 distributed over the surface 404.

The heat exchange material 402 may be fabricated from a permeable material having high thermal conductivity. In one embodiment the heat exchanger material may include a plurality of copper or carbon fibers that are oriented in a direction generally aligned with the radial axis 312.

In operation the distribution passages 412 in the manifold 400 are configured to cause the change in fluid flow direction between the transversely directed flow in the feed passages 410 and the radially directed flow at the openings 414 of the distribution passages and through the heat exchange material 402. The fibers of the heat exchange material 402 provide a large heat exchange surface area and small fluid passages within the heat exchange material. The heat flow 314 in the first heat exchanger 308 is via the shorter (i.e. radial) dimension taking advantage of the larger cross-sectional area and short distance through the manifold 400 to minimize a temperature drop due to the heat flux and a finite thermal conductivity of the materials.

The second heat exchanger 316 has a generally similar configuration to the first heat exchanger 308, having a manifold 418 and heat exchange material 420, but includes an additional heat transfer layer 428 having a fluid inlet 430 and a fluid outlet 432. The manifold 418 includes a plurality of feed passages 424 and a plurality of distribution passages 426 in fluid communication with the heat exchange material 420. The fluid inlet 430 is in fluid communicating with the inlet 268 in the cap 324 for receiving the flow of heat transfer fluid from the respective compliant tube. The heat transfer fluid thus flows into the fluid inlet 430, through the additional heat transfer layer 428, and is discharged through the outlet 432 and back through a respective compliant tube to the external heat source or sink.

The regenerator 304 (shown partially cut away in FIG. 4) is enclosed within the sleeve 320 that provides a sealed fluid flow passage between the first and second heat exchangers 308 and 316. As best shown in FIG. 3, a perimeter of the sleeve 320 is coupled to the enclosure 200 at 322 and is coupled to the cap 324 at 326. In one embodiment the sleeve is welded to the cap 324 at 326. In operation, fluid flowing through the first heat exchanger 308 may be at a temperature of about 700° C., while fluid flowing through the second heat exchanger 316 may be at about 50° C. The sleeve 320 has a relatively thin wall thickness to reduce heat flow along the wall between the first heat exchanger 308 and the second heat exchanger 316, and bears the stresses associated with the large temperature gradient to which it is subjected. In one embodiment, the sleeve 320 may be fabricated from Inconel or stainless steel or other materials that retains strength over a wide temperature range and have relatively low thermal conductivity.

When operated as an engine the regenerator 304 converts thermal energy $Q_{in}$ provided from the external thermal source 122 into acoustic energy, thereby amplifying the acoustic power traveling through the regenerator 304. The fluid flow through the regenerator 304 is predominantly aligned with the radial axis 312. The number of thermal converters in the plurality is selected to provide a combined regenerator area for the thermal converters 204-214 that reduces fluid flow losses within the fluid flow passages 306 of the respective regenerators while reducing thermal stresses experienced by the sleeve 320 due to the large thermal gradient. Fluid flow loss considerations dictate that the area of the regenerator should be relatively large, while a length along the radial axis 312 should be as small as is compatible with other constraints. Having a plurality of regenerators in discrete cylindrical thermal converters 204-214 distributes the overall regenerator area among the plurality of thermal converters such that each individual regenerator has an aspect ratio of in the region of about 1:1 (i.e. a ratio of diameter to radial length). A plurality of regenerators with this aspect ratio effectively reduces fluid flow losses through the regenerator 304 without excessive thermal stresses. The stresses experienced by the sleeve 320 under the operating thermal gradient increase with diameter and having multiple sleeves of reduced diameter reduces the stress experienced by each sleeve. The number of thermal converters 204-214 thus represents a trade-off between at least the above factors and in some embodiments there may be more or less thermal converters in the plurality depending on operating requirements. Embodiments that facilitate a further increase in the number of discrete thermal converters are described later herein.

Figure 5:
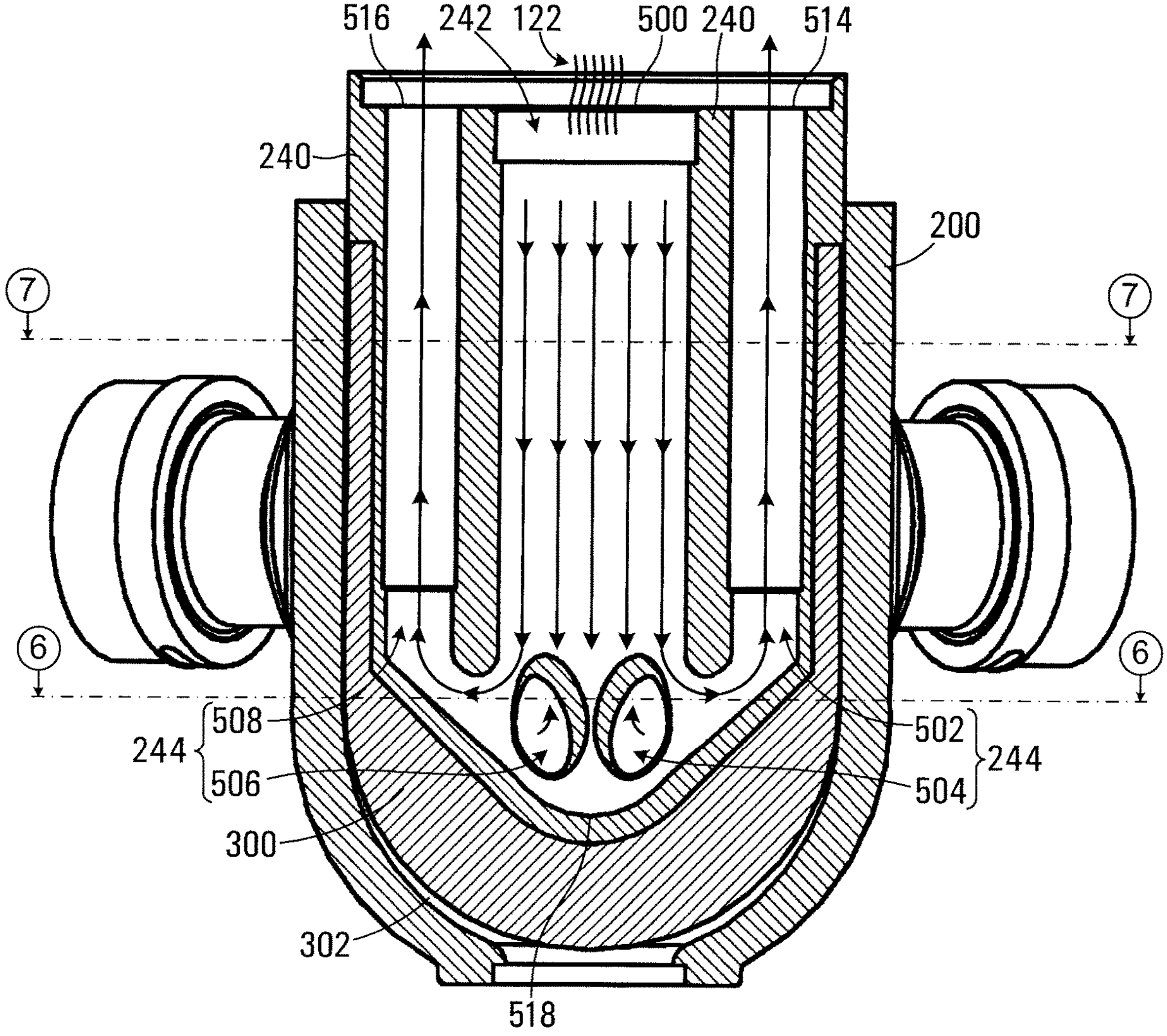
FIG. 5 is a second cross-sectional view of a portion of the thermal apparatus taken along the line 5-5 in FIG. 2.

The thermally conductive core 300 is operably configured to transfer thermal energy between the external environment (i.e. the external thermal source 122) and the working fluid flowing through the fluid passages within the body of the first heat exchanger 308. In FIG. 5 the thermally conductive core 300 and the insert 240 are shown in a further cross-sectional view taken along the line 5-5 in FIG. 2. Referring to FIG. 5, the centrally located conduit 242 receives the external thermal source 122, which in one embodiment may comprise a burner fueled by a combustible fluid that produces a flame within the conduit 242. In other embodiments, the thermal source may be remotely located with respect to the conduit 242 and may include a heat pipe or a heat transfer fluid for transporting heat to the central conduit.

The thermally conductive core 300 may be fabricated from a high thermal conductivity material such as copper, which is susceptible to corrosion due to combustion products associated with the flame. In this embodiment, the insert 240 protects the thermally conductive core 300 by covering the centrally located conduit 242 and the return conduits 244 in a corrosion resistant material. In one embodiment the corrosion resistant material may be Inconel, which has sufficient strength at an operating temperature of the thermoacoustic transducer 100 to withstand a pressure difference between the working fluid and an ambient pressure. Inconel also has excellent oxidization resistance at elevated temperature, which protects surfaces from corrosion.

Figure 6:
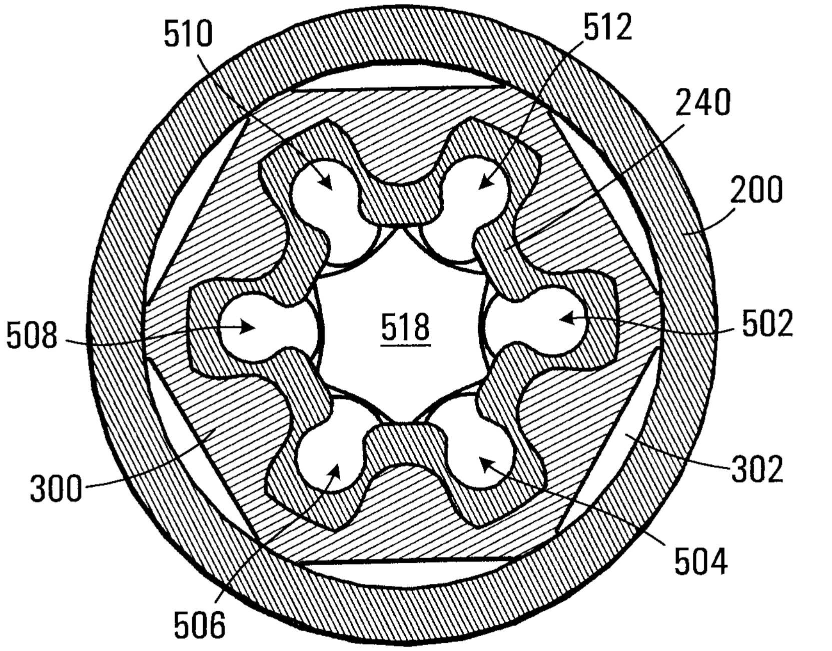
FIG. 6 is a further cross-sectional view of a portion of the thermal apparatus shown in FIG. 2 taken along the line 6-6 in FIG. 5.

The centrally located conduit 242 has an opening 500 for receiving the external thermal source 122 and terminates in a plurality of return conduits 244 (shown individually as return conduits 502, 504, 506, 508, 510, and 512 in FIG. 5) that extend back through the insert 240 adjacent to the centrally located conduit and have respective openings proximate the centrally located conduit opening 500. In the cross-sectional view of FIG. 5, only a portion of return conduits 504 and 506 are shown at the terminating end of the centrally located conduit 242. The return conduits 502 and 508 are shown in full cross-sectional detail along with their respective openings 514 and 516. A further cross sectional view is shown in FIG. 6 taken along the line 6-6 in FIG. 5 showing an additional pair of return conduits on the back of the insert 240 at 510 and 512 and another pair at the front at 504 and 506. The return conduits 510 and 512 are obscured in the cross-section of FIG. 5.

The plurality of return conduits 502-512 are located within the core 300 for transfer of heat between the heat source or heat sink in the centrally located conduit 242 and the core. In one embodiment with operation of the thermoacoustic transducer 100 as an engine, a burner or a burner flame is received within the centrally located conduit 242 and produces a heat flux that impinges on a terminal end surface 518 of the conduit. The terminal end surface 518 redirects the hot exhaust products into the plurality of return conduits 502-512. In one embodiment the return conduits 502-512, which are located adjacent to the thermally conductive core 300, include fins in order to control the heat flux along the length of the return conduits. The thermally conductive core 300 in turn is thermally coupled to each of the plurality of thermal converters 204-214 for transferring heat between the thermally conductive core 300 and the thermal converters.

Figure 7:
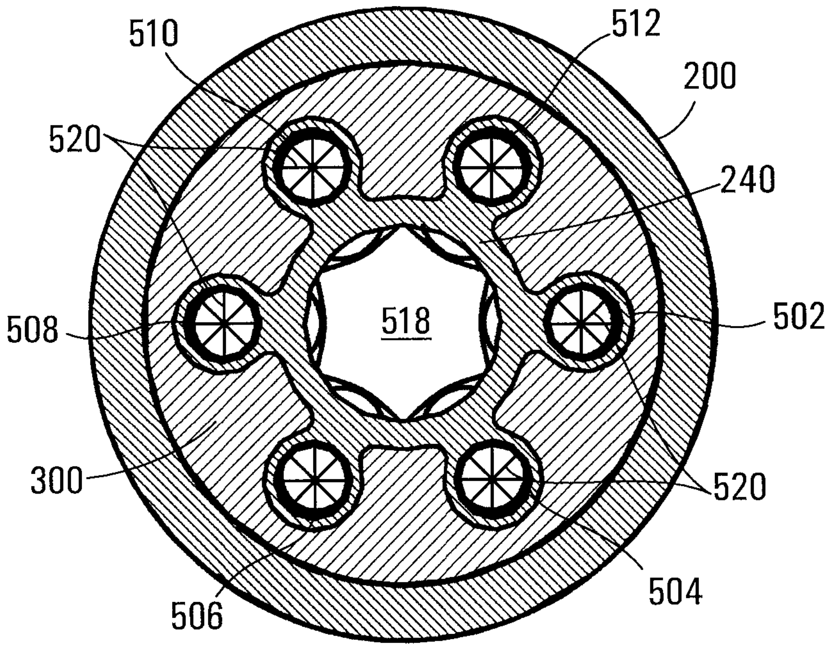
FIG. 7 is another cross-sectional view of a portion of the thermal apparatus shown in FIG. 2 taken along the line 7-7 in FIG. 5.

Referring to FIG. 7, a further cross sectional view is shown taken along the line 7-7 in FIG. 5. In this embodiment the return conduits 502, 504, 506, 508, 510, and 512 each include fins 520 inserted along at least a portion of their length for enhancing heat transfer between the external thermal source 122 to the insert 240 and to the thermally conductive core 300. In one embodiment the thermally conductive core 300 may be a copper material that encloses the insert 240 to provide a good thermal contact with the insert material.

When a burner provides the external thermal source 122, hot exhaust gases are discharged from the openings 514 and 516 of the respective return conduits 502-512. As best shown in FIG. 2, the disposition of the centrally located conduit 242 and the openings in the return conduits 244 conveniently facilitate coupling of heat from the external thermal source 122 and also discharge of exhaust products via a single opening in the housing 250 provided by the standoff sleeve 252. The disposition of openings in the return conduits 244 also facilitates the inclusion of a recuperator (not shown) partially or entirely within the standoff sleeve, where the discharged hot exhaust gasses preheat the combustible fluid and combustion air used to fuel the burner.

The thermal apparatus 116 shown in FIGS. 2-6 has a generally cylindrically shaped plenum 302 the plurality of thermal converters 204-214 are oriented in a substantially radial direction with respect to a center of the cylindrically shaped plenum (i.e. radially oriented with respect to the cylindrical axis 310 shown in FIG. 3).

Figure 8:
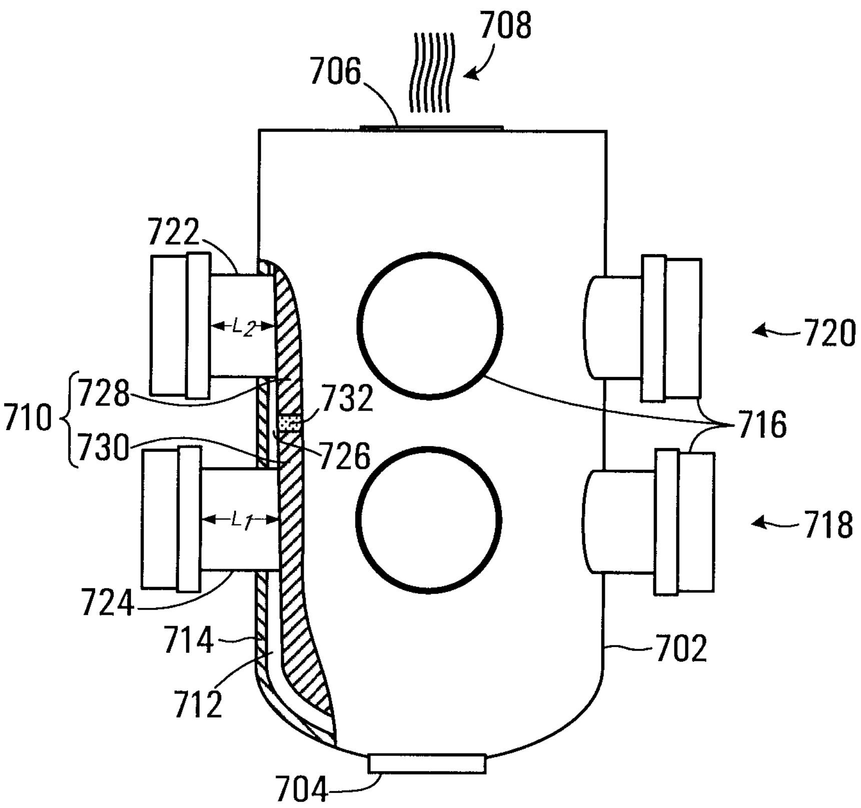
FIG. 8 is an elevational view of an alternative disclosed embodiment of a thermal apparatus.

Referring to FIG. 8, an alternative disclosed embodiment of the thermal apparatus is shown generally at 700. The thermal apparatus 700 includes an enclosure 702 having a first fluid port 704 and an opening 706 to a centrally located conduit (not shown) for receiving heat from an external thermal source or rejecting heat to an external thermal sink 708. The thermal apparatus 700 also includes a thermally conductive core 710 shown in partially cut-away view in FIG. 8. A plenum 712 is defined between the core and a wall 714 of the enclosure 702. In this embodiment a plurality of thermal converters 716 are radially arranged about the plenum 712 in a plurality of adjacent rows and are in fluid communication with the plenum. A first row 718 of thermal converters 716 are disposed proximate the first fluid port 704 and a second row 720 of thermal converters is spaced further along the enclosure 702 from the first fluid port. In other embodiments, additional rows of thermal converters 716 may be successively spaced further along the enclosure 702 from the first fluid port 704. The multiple rows of thermal converters 716 provide a greater overall regenerator area, which may be required for some thermal apparatus embodiments.

In the embodiment shown, a regenerator portion 722 of the thermal converters in the second row 720 has a different length ($L_2$) in a radial direction than the length $L_1$ of the regenerator portion 724 of the thermal converters in the first row 718. In this embodiment the length $L_1$ of the regenerator portion 724 is longer than the length $L_2$ of the regenerator portion 722. The thermal converters 716 in the second row 720 are thus configured to operate at a different working fluid temperatures than the thermal converter in the first row. To permit heat transfer at different temperatures between the thermally conductive core 710 and the thermal converters in the respective first and second rows 718 and 720, the thermally conductive core is divided into two portions 728 and 730 by a thermal insulating material 732. The thermal core portions 728 and 730 are thus capable of operating at differing temperatures.

Generally, if the temperature in given row is higher, the row would be configured with a longer regenerator portion to prevent an excessive temperature gradient across the regenerator. Regenerator length thus represents a tradeoff between flow friction, heat exchange effectiveness, and thermal stresses as the temperature gradient across the regenerator increases. In other embodiments the regenerators 722 and 724 in the respective rows may have substantially the same length in the radial direction.

In this embodiment, the plenum 712 also has a tapered cross-sectional flow area. A flow area of the plenum 712 proximate the first row 718 differs from a flow area of the plenum proximate the second row 720. The greater cross-sectional area proximate the first fluid port 704 serves both rows 718 and 720 of thermal converters 716, while the cross sectional area of a plenum portion 726 between the first row 718 and the second row 720 has a tapering cross-sectional area, since this plenum portion only serves the second row 720 of thermal converters 716. The tapered plenum results in increased fluid velocity with reducing cross-sectional area to match the Bernoulli pressures, which could otherwise drive a streaming flow between rows 718 and 720.

In FIG. 8, the plurality of thermal converters 716 are disposed such that thermal converters in the first and second rows 718 and 720 are disposed vertically above each other. In other embodiments the rows 718 and 720 may be radially staggered to offset thermal converters in adjacent rows.

Figure 9:
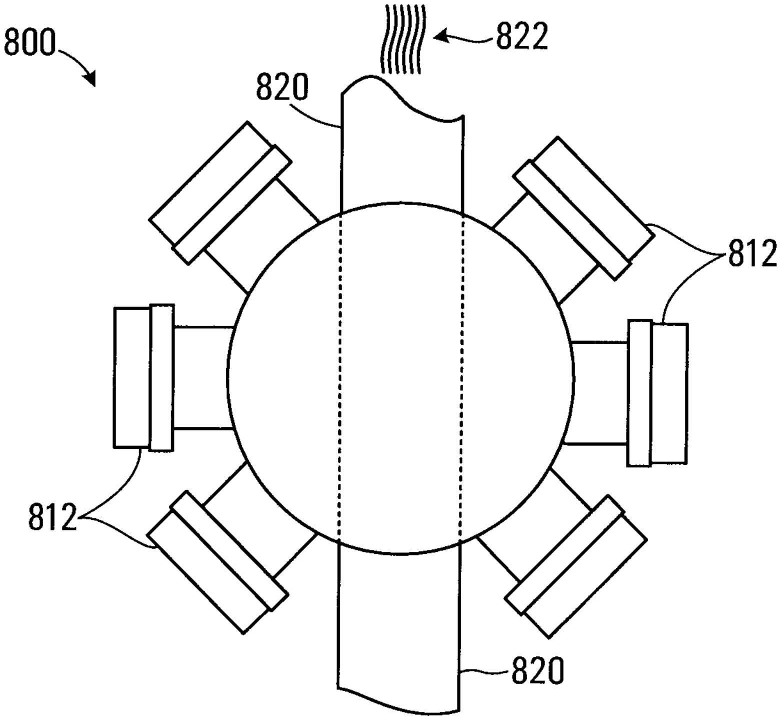
FIG. 9 is a plan view of an another disclosed embodiment of a thermal apparatus.
Figure 10:
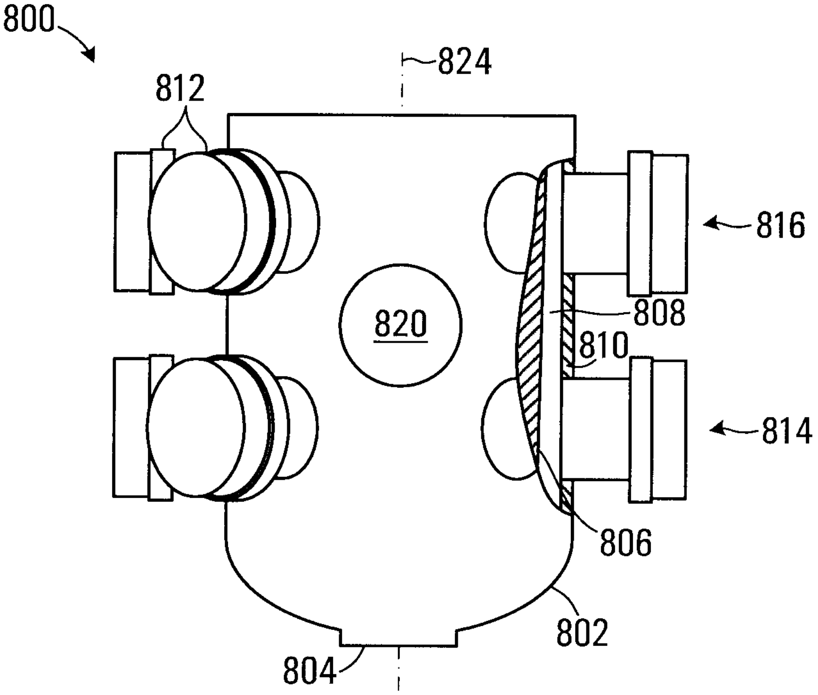
FIG. 10 is an elevational view of the embodiment of the thermal apparatus shown in FIG. 8.

Referring to FIG. 9 and FIG. 10, an alternative embodiment of a thermal apparatus is shown generally at 800. The thermal apparatus 800 includes an enclosure 802 having a first fluid port 804. The thermal apparatus 800 also includes a thermally conductive core 806 shown in cut-away view in FIG. 10. A tapered plenum 808 is defined between the core 806 and a wall 810 of the enclosure 802. In this embodiment, a plurality of thermal converters 812 are radially arranged about the plenum 808 in adjacent rows 814 and 816 and are in fluid communication with the plenum. The first row 814 is disposed proximate the first fluid port 804 and the second row 816 is spaced further along the enclosure 802 from the first fluid port. A conduit 820 runs transversely through the enclosure 802 with respect to a cylindrical axis 824 of the enclosure 802 and plenum 808. The conduit 820 channels a heat transfer fluid 822 through the conduit 820, which transfers heat with the thermally conductive core 806.

Figure 11:
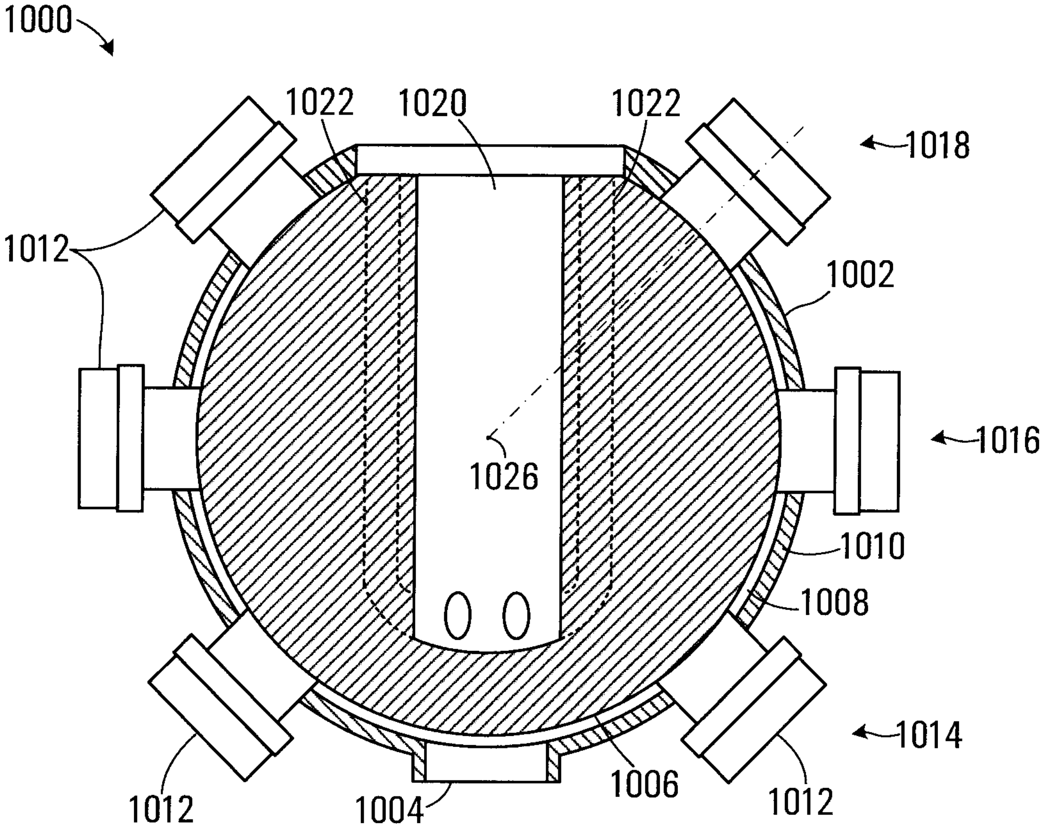
FIG. 11 is a cross-sectional view of another disclosed embodiment of a thermal apparatus.

Referring to FIG. 11, another embodiment of a thermal apparatus is shown in cross sectional view generally at 1000. The thermal apparatus 1000 includes an enclosure 1002 having a first fluid port 1004. The thermal apparatus 1000 also includes a thermally conductive core 1006. A generally spherically shaped plenum 1008 is defined between the core 1006 and a wall 1010 of the enclosure 1002. In this embodiment, a plurality of thermal converters 1012 are radially arranged about the plenum 1008 in three adjacent rows 1014, 1016, and 1018 and are all in fluid communication with the plenum. Each thermal converter 1012 is oriented in a substantially radial direction indicated by the line 1024 with respect to a center 1026 of the spherically shaped plenum 1008. A centrally located conduit 1020 receives thermal energy from external thermal source 122 and terminates in a plurality of return conduits 1022, as described in connection with the FIG. 2 embodiment above. The spherically shaped plenum 1008 may be beneficial when the external housing 250 is omitted, since wall thicknesses of the enclosure would need to be substantially greater to withstand the pressure differential. The spherical shape is advantageous when implementing pressure vessels due to inherently lower hoop stresses and thus comparatively thinner walls due to the spherical symmetry. The thinner enclosure wall allowed by the increased symmetry indirectly also leads to lower thermal stresses.

The above disclosed embodiments provide sufficiently configuration flexibility to provide a required overall regenerator area while minimizing losses associated with fluid flow and accommodating inherent thermal stresses during operation of the thermoacoustic transducer 100.

While specific embodiments have been described and illustrated, such embodiments should be considered illustrative of the invention only and not as limiting the invention as construed in accordance with the accompanying claims.

What is claimed is:

1. An apparatus for performing energy transformation between thermal energy and acoustic energy, the acoustic energy being associated with a periodic flow of a working fluid within an acoustic power loop of a thermoacoustic transducer, the apparatus comprising:
- an enclosure defining a common central plenum, the central plenum having a first fluid port for providing fluid communication with the acoustic power loop;
- a plurality of discrete cylindrical thermal converters radially positioned on the enclosure and about the central plenum, each thermal converter comprising:
  - a regenerator;
  - a second fluid port for providing fluid communication between each of the thermal converters and the acoustic power loop; and
  - fluid flow passages in fluid communication with the central plenum and extending through the regenerator to the second fluid port.

2. The apparatus of claim 1 further comprising a thermally conductive core disposed within the central plenum and thermally coupled to each of the plurality of thermal converters for transferring heat between the thermally conductive core and the thermal converters.

3. The apparatus of claim 2 wherein each thermal converter comprises a first heat exchanger having a thermally conductive body defining a portion of the fluid flow passages extending between the central plenum and the regenerator, the thermally conductive body being thermally coupled to the thermally conductive core and being operable to transfer thermal energy between the working fluid and the thermally conductive body.

4. The apparatus of claim 3 wherein the thermally conductive core is operably configured to transfer thermal energy between an external environment and the working fluid flowing through the fluid passages within the thermally conductive body of the first heat exchanger.

5. The apparatus of claim 3 wherein each of the thermal converters comprises a second heat exchanger having a thermally conductive body defining a portion of the fluid flow passages extending between the regenerator and the second fluid port, the thermally conductive body being operably configured to transfer thermal energy between the working fluid and the thermally conductive body.

6. The apparatus of claim 5 wherein the thermally conductive body is thermally coupled to transfer heat between the thermally conductive body and one of a heat transfer fluid and a heat pipe.

7. The apparatus of claim 2 wherein the thermally conductive core comprises a centrally located conduit for receiving a heat source or heat sink.

8. The apparatus of claim 7 wherein the centrally located conduit is oriented either:
- aligned with a cylindrical axis associated with the central plenum; or
- transverse to a cylindrical axis associated with the central plenum.

9. The apparatus of claim 7 where the centrally located conduit terminates in a plurality of return conduits extending back through the thermally conductive core adjacent to the centrally located conduit and wherein the return conduits are configured to transfer heat between the heat source or the heat sink and the thermally conductive core.

10. The apparatus of claim 7 wherein the thermally conductive core comprises a copper material and further comprising an insert defining at least one of the centrally located conduit and the plurality of return conduits, the insert comprising a corrosion resistant material having sufficient strength at an operating temperature to withstand a pressure difference between the working fluid and an ambient pressure.

11. The apparatus of claim 1 wherein the acoustic power loop comprises a thermal buffer in fluid communication with the first fluid port, the thermal buffer being shaped to reduce convective heat transfer from the working fluid due to circulating gas flows within the thermal buffer.

12. The apparatus of claim 11 further comprising a housing extending from an end of the thermal buffer distal to the first fluid port and enclosing the central plenum and the plurality of thermal converters, the housing being operable to hold a charge of insulating gas at a pressure substantially equivalent to a pressure of the working fluid, the insulating gas being operable to reduce parasitic heat transfer between the working fluid and a surrounding environment.

13. The apparatus of claim 12 further comprising a thermally conductive core disposed within the central plenum and thermally coupled to each of the plurality of thermal converters for transferring heat between the thermally conductive core and the thermal converters, the thermally conductive core having a centrally located conduit for receiving a heat source or heat sink and wherein the housing comprises a standoff sleeve providing access to the centrally located conduit from outside the housing for exchanging thermal energy between the heat source or heat sink and the thermally conductive core.

14. The apparatus of claim 1 wherein the acoustic power loop comprises:
- a plurality of compliant tubes each compliant tube being connected to one of the second fluid ports of the plurality of thermal converters, the compliant tubes being operable to deflect under thermally induced strains caused by a temperature differential across the thermal converter during operation.

15. The apparatus of claim 1 wherein the plurality of thermal converters are radially arranged about the central plenum in a plurality of adjacent rows, the first row being disposed proximate the first fluid port and each successive row being spaced further from the first fluid port.

16. The apparatus of claim 1 wherein the central plenum comprises one of:

a generally spherically shaped central plenum and wherein each of the plurality of thermal converters is oriented in a substantially radial direction with respect to a center of the spherically shaped central plenum; or a generally cylindrically shaped plenum and wherein each of the plurality of thermal converters is oriented in a substantially radial direction with respect to a center of the cylindrically shaped central plenum.

17. The apparatus of claim 15 wherein the thermal converters in successive rows are configured to operate at a different working fluid temperatures than the thermal converter in the first row.

18. The apparatus of claim 17 wherein the regenerators of the thermal converters in successive rows have at least one of a differing length in the radial direction and a different cross-sectional area than the respective regenerators of the thermal converters in the first row.

19. The apparatus of claim 15 wherein the central plenum has a tapered cross-sectional flow area such that a flow area of the central plenum proximate the first row differs from a flow area of the central plenum proximate subsequent rows.

20. The apparatus of claim 1 wherein each regenerator of the plurality of thermal converters comprises a sleeve enclosing the regenerator, and wherein the number of thermal converters in the plurality of thermal converters is selected to provide a combined regenerator area that reduces fluid flow losses within the regenerator while reducing thermal stresses experienced by the sleeve due to a thermal gradient established across the regenerator during operation.

21. A thermoacoustic transducer apparatus comprising the apparatus of claim 1 and further comprising:

a mechanical converter operable to provide power conversion between acoustic power and mechanical power, the mechanical converter including at least one diaphragm defining a first chamber and a second chamber within the mechanical converter; and wherein the acoustic power loop comprises a first transmission duct extending between the first fluid port and the first chamber and a second transmission duct extending between the second fluid ports of the plurality of discrete thermal converters and the second chamber.

22. The apparatus of claim 21 wherein the second transmission duct comprises a plurality of ducts extending from the respective second fluid ports and merging into one or more transmission ducts in fluid communication with the second chamber.

23. The apparatus of claim 21 wherein the plurality of ducts comprise one of a compliant bellows section and an o-ring sealed section that facilitates accommodation of thermally induced strains caused by a temperature differential across the thermal converter during operation.

24. The apparatus of claim 20 wherein the acoustic power loop comprises a thermal buffer in fluid communication with the first fluid port, the thermal buffer being shaped to reduce convective heat transfer from the working fluid due to circulating gas flows within the thermal buffer and further comprising a housing extending from an end of the thermal buffer distal to the first fluid port and enclosing the central plenum and the plurality of thermal converters, the housing being operable to hold a charge of insulating gas at a pressure substantially equivalent to a pressure of the working fluid, the insulating gas being operable to reduce parasitic heat transfer between the working fluid and a surrounding environment.

25. The apparatus of claim 23 wherein the housing comprises one of a bellows seal and a sliding compliant seal between the housing and the thermal buffer and the second transmission duct.

* * * * *